Nov. 18, 1952     R. C. PAULUS     2,618,387
FRUIT INSPECTION AND GRADING SYSTEM
Filed July 21, 1950     2 SHEETS—SHEET 1
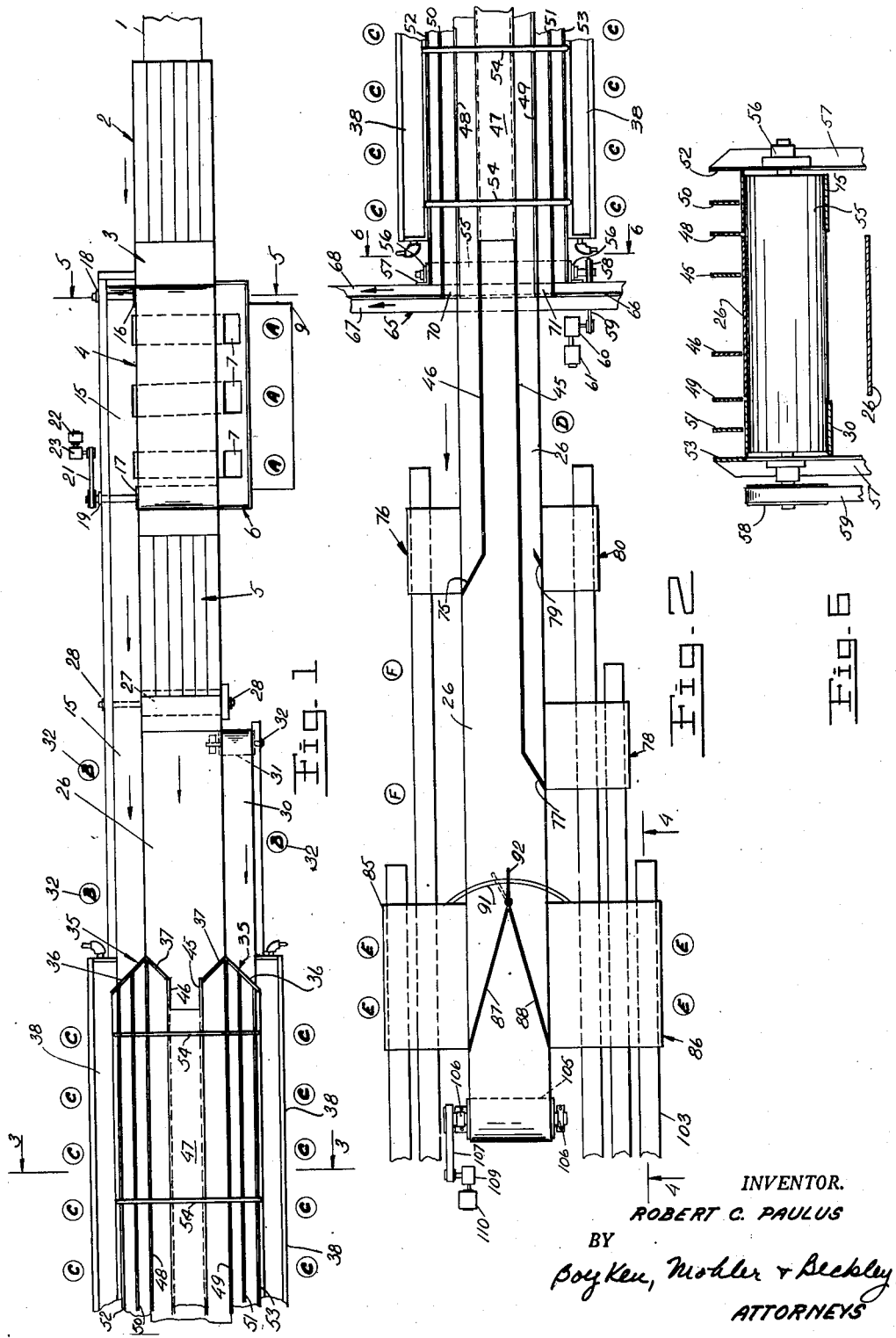
INVENTOR.
ROBERT C. PAULUS
BY
Boyken, Mohler & Beckley.
ATTORNEYS Nov. 18, 1952  R. C. PAULUS  2,618,387
FRUIT INSPECTION AND GRADING SYSTEM
Filed July 21, 1950  2 SHEETS—SHEET 2

INVENTOR.
ROBERT C. PAULUS.
BY
Boyken, Mohler + Beckley.
ATTORNEYS

Patented Nov. 18, 1952

2,618,387

UNITED STATES PATENT OFFICE 2,618,387

FRUIT INSPECTION AND GRADING SYSTEM

Robert C. Paulus, Portland, Oreg.

Application July 21, 1950, Serial No. 175,043

3 Claims. (Cl. 209—125)

This invention relates to a method of inspecting fruit and the like, and more particularly to a device which may be employed to inspect, grade, and separate fruit or similar products from a mass containing units of different grade and quality.

In the canning or packaging of fruits, the fruit is graded or separated into grades of different size and quality prior to canning or packaging. These grades in the descending order of quality are generally: fancy, choice, standard, seconds and water (or pie) grade.

Heretofore the general practice in grading and separating a product such as fruit has been to support the fruit to be graded on a conveyor belt for movement along a horizontal path of travel and to manually remove the fruit at various points in the path of travel of the fruit depending on its grade, and then transfer the same to the appropriate filling station at which the product is canned. Or the fruit may be selected according to its quality and immediately inserted into a can without additional handling.

This practice generally involves the handling of each piece of fruit to inspect it from all sides for immediate canning or the transfer to another belt which carries fruit of one particular grade to the appropriate filler.

It is well known that excessive handling of delicate fruit such as pears mars its appearance and therefore its quality thereby resulting in a lower value. Furthermore, the handling of such fruit represents a loss of time and effort on the part of the inspector, which loss results in a loss of profits or an increase in the cost of the fruit when sold.

In addition, inspection and grading processes have, in the past, involved the use of a large number of conveyor belts (usually one for each grade) which increases machinery cost and also its maintenance. Furthermore, the area of plant space required for four or five conveyors is considerable and represents a high overhead cost which in turn is reflected in a loss of profits.

Another disadvantage which is often inherent in prior grading methods is that the canning operator has various grades to choose from on the belt before him and therefore the actual canning operation is slowed up because of the time taken to sort the fruit in addition to the manual operation of canning.

The main object of the present invention is to eliminate the disadvantages of present inspection systems and installations.

Another object of the invention is the provision of a fruit inspection table which may be set up in a relatively small space and which permits speedy inspection and grading of fruit prior to the filling operation.

Yet another object of the invention is the provision of a structure comprising a unique arrangement of conveyor belts which permits a great reduction of the number of manual operations involved thereby reducing the number of operators required.

Still another object of the invention is the provision of an inspection table which lends itself to a high speed canning operation and which obviates the selection process which heretofore has been one of the functions of the operator who fills the cans.

Another object of the invention is the provision of a system for fruit inspection and grading which is extremely flexible and which adapts itself readily to different runs of fruit. It should be noted in this connection that an inspection table which is highly efficient when the various grades of fruit bear a fixed proportion to the total amount may become inefficient when there is a sudden change in such proportion.

Other objects and advantages will be apparent from the following specification and from the drawings wherein:

Fig. 1 is a semi-schematic plan view of one end of the structure of the present invention.

Fig. 2 represents a continuation of the structure of Fig. 1 showing the other end of the invention.

Fig. 6 is a cross-sectional view through a portion of the conveyor system as taken along lines 6—6 of Fig. 2.

The structure of the present invention is elongated to such an extent that the portion at which the first stages of the invention are carried out is represented in Fig. 1 the direction of movement of the fruit being from right to left. The portion representing the later stages is shown in Fig. 2.

The invention will be described in connection with the inspection and grading of the ripened pears since the problems involved with pears are greater than with other fruit because of their susceptibility to damage. However, it will be apparent that the use of the invention is not necessarily limited to one type of product.

Referring to Fig. 1, a chute or belt 1 supports the fruit for horizontal movement from the peelers (not shown) to a turner 2 and connects with the turner to transfer the fruit from the belt to the turner in the usual manner. The fruit comes from the peeler in halves after being cut through the core longitudinally of the pear.

The turner 2, which is conventional, receives the fruit halves from the belt or chute 1 and automatically turns the halves so that their core sides are up and at the same time carries the fruit forwardly in the direction of travel indicated by arrows in Fig. 1. The elevation of the belt 1 is somewhat higher than that of the turner 2 so that the fruit halves are carried through the turner by gravity. This particular structure is old and no claim is made thereto except insofar as the same is employed in combination with the remainder of the invention.

Figure 5:
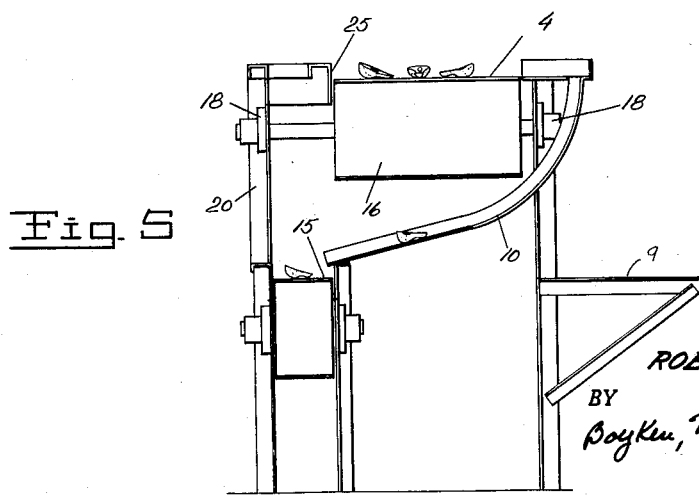
Fig. 5 is a vertical cross-sectional view through another sorting station as taken along lines 5—5 of Fig. 1.

The pears are ejecting from the forward end of the turner 2 with their core sides up and slide downwardly along an inclined chute 3 and onto a relatively short horizontally disposed belt conveyor generally designated 4 on which the pears are carried to a second turner 5. Adjacent the upper run of the belt 4 is a stationary shelf 6 extending longitudinally of said belt and having a plurality of openings 7 therein adapted to permit the passage of fruit halves therethrough. Inspection personnel may be stationed adjacent the shelf 6 as schematically indicated at A in Fig. 1. A platform 9 must be provided on which such personnel may stand since the elevation of the upper run of the belt 4 is somewhat higher than the subsequent parts of the inspection process. A plurality of chutes 10 (Fig. 5) are secured at their upper ends to the shelf 6 and are inclined downwardly and in a direction transversely of the belt 4 and terminate at a point directly under the edge of the belt 4 which is opposite from the shelf 6. These chutes 10 register with the openings 7 in the shelf 6 so that fruit passed through said openings will be carried downwardly and under the belt 4 to endless belt 15 which is adjacent belt 4, but spaced downwardly therefrom. The endless belt 4 is supported at its ends on pulleys 16 and 17 journalled in bearings 18 and 19 respectively which in turn are supported on uprights 20 (Figs. 1 and 5). The forward pulley 17 ("forward" being the direction toward which the fruit is moving) is driven by a belt 21 which in turn is driven by a motor 22 through a reducer 23. A stationary frame member 25 secured to uprights 20 extends longitudinally alongside the edge of the belt 4 that is opposite the shelf 6 to prevent the fruit on said belt from falling off (Fig. 5). The operators A visually inspect the core side of the fruit as it moves along belt 4 and remove any fruit having defects which must be removed. Fruit having no core defects continues along the belt 4 to the second turner 5. Defective fruit removed from the belt 4 is passed through the openings 7 and conveyed by the chutes 10 to the belt 15.

The turner 5 then automatically turns the passed fruit so that it is ejected at the forward end of the turner with the core side down and the convex side up onto a belt conveyor 26 which is similar to belt 4 but substantially longer. Due to the change in elevation of the fruit as it passes downwardly through the turner 5 the horizontally extending belt 15 is disposed in the same horizontal plane as belt 25 and is in side by side relationship with the latter which receives the fruit, core down, from the turner 5.

The belt 26 is supported at its rear end adjacent the turner 5 on an idler pulley 27 which is mounted in bearings 28. On the side of the belt 26 opposite the belt 15 is another belt 30 which is preferably of the same width as belt 15 and which is positioned with its rear end adjacent the forward end of turner 5. This belt 30 is carried at its rear end by idler pulley 31 supported in bearings 32.

Inspection personnel, schematically indicated at B (Fig. 1), may be stationed alongside belts 26 and 30 respectively. These operators B visually inspect the convex sides of the fruit coming from turner 5 and transfer fruit having defects which must be removed from the belt 26 to belt 15 or 30 depending on which side of the conveyor the operator is positioned. It will be noted that fruit having no defects whatever (i. e. fancy fruit) continues along the belt 26 untouched.

Figure 3:
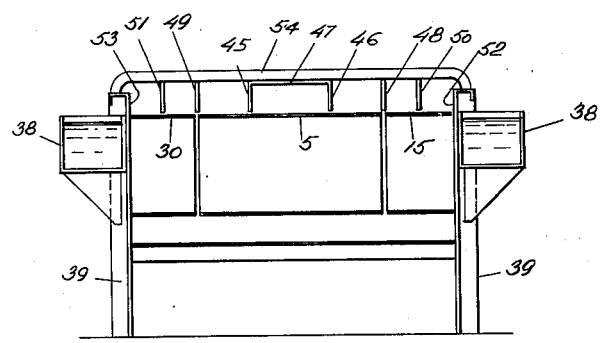
Fig. 3 is a vertical cross-sectional view taken through a portion of the invention showing the sorting station. The belt supports are omitted for clarity.

Spaced forwardly of the turner 5 are a pair of deflectors generally designated 35, each comprising two angularly connected sides 36, 37. These deflectors are positioned so that the sides 36 deflect the fruit carried by belts 15 and 30 horizontally outwardly and sides 37 are positioned to deflect the fruit which is carried by the marginal portions of the belt 26 horizontally inwardly towards the center of belt 26. The fruit deflected from belts 15 and 30 falls into water troughs 38 positioned on opposite sides of the belt 26 and adjacent the belts 15 and 30 respectively. These troughs 38 are supported on vertical supports 39 and are preferably disposed so that the level of the water within the troughs is only slightly below the level of the belts 15 and 30 (Fig. 3). The water is continuously running through the troughs 38 in the direction of the flow of fruit on the belt in the usual manner.

The length of the troughs 38 is such as to provide space for personnel schematically indicated at C (Figs. 1 and 2). These personnel remove the fruit from the troughs 38 and cut out the defective portions before replacing them on the belts in a manner which will subsequently be described.

A plurality of longitudinally extending vertically disposed stationary guide plates are positioned over the belts 26, 15 and 30 between the troughs 38 to define a series of transversely spaced passageways for different grades of fruit. Extending forwardly from the inner vertical edges of deflectors 35 and rigidly secured thereto are guides 45, 46 between which the pear halves of fancy grade are adapted to pass.

A cover plate 47 is provided between the upper edges of guides 45, 46 to prevent fruit of other grades from being mixed with the fancy grade (Figs. 1, 3).

Spaced outwardly of guides 45, 46 and parallel thereto are guides 48, 49 which are secured at their rear ends to the apex of the deflectors 35. Guide 48 is positioned directly over the edge of belt 26 adjacent belt 15 while guide 49 is positioned directly over the edge of belt 26 adjacent belt 30. Guides 45 and 49 define a path of travel on belt 26 along which choice pears may be carried while standard grade may be confined to the space between guides 48 and 46.

It will be apparent that operators C, after removing defects from the pears in troughs 38 may place them between guides 45 and 49 or between guides 48 and 46 depending on their size and the extent to which their shape has been impaired. The cover plate 47 above the fancy fruit provides a surface across which the operators may slide the fruit when required.

Spaced outwardly of guides 48 and 49 are guides 50 and 51 which are positioned centrally of belts 15 and 30 respectively and which are secured at their rear ends to the sides 36 of deflectors 35.

Guides 52 and 53 which are positioned along the outer edges of belts 15 and 30 respectively are preferably frame members having a vertically disposed leg adjacent the edge of belts 15, 30 respectively and a horizontal flange as shown in Fig. 3. The guides 48 and 50 thus define a path of travel on belt 15 for standard grade pears while a similar path or passageway for standard grade is defined on belt 30 between guides 49 and 51. Guides 50, 52 and guides 51 and 53 define passageways for water grade pears on belts 15 and 30 respectively.

By the above structure, five different grades of fruit may be sorted and carried forwardly on three conveyor belts and at the same time positive separation of pears of different grades is insured.

The frame members 52, 53 and the troughs 38 are preferably supported on vertical support members 39 (Fig. 3). For the purpose of supporting the guide elements 45—51 above and clear of the moving belts a plurality of pipes or bars 54 spaced longitudinally of the conveyor extend between the frame members 52, 53 and are secured at their ends to said members as by welding (Figs. 1, 2 and 3). The guide may be welded to these pipes at their upper edges. By this structure the belts are not engaged by any stationary members which would create resistance to their movement.

The cover plate 47 extends approximately the length of the troughs 38 and may be omitted for the remainder of the length of the guide elements 45, 46 (Fig. 2). The belts 15 and 30 are supported adjacent the forward ends of the troughs 38 by driving pulley 55 which extends transversely between the upper and lower runs of belt 26 (Fig. 6). This pulley 55 is journalled in bearings 56 which in turn are supported on uprights 57. A drive pulley 58 mounted on the shaft of pulley 55 drives belts 15 and 30 at the same speed as belt 26 and at the same time pulley 55 provides a support for the upper run of belt 26 (Fig. 6). A drive belt 59 connects the pulley 55 with a reducer 60 which in turn is driven by motor 61 (Fig. 2).

As best seen in Fig. 2 a belt 65 runs transversely of belt 26 between the upper and lower runs of the latter for the purpose of removing seconds and pie grade pears from the belts 15 and 30. A central guide 66 extends longitudinally along belt 65 centrally of the same thereby dividing the belt into two longitudinally extending portions 67, 68. The portion 67 is connected with the passageways between guides 49, 51 and between guides 48, 50 while portion 68 receives pears from the passageways between guides 50, 52 and between guides 51, 53.

A relatively short chute 70 is secured at one end to the central guide 66 on belt 65 and at the other end to the guides 48 and 50 so that pears of "second" quality may be carried from belt 15 onto the portion 67 of transverse belt 65. Similarly a chute 71 is secured to guides 49 and 51 for conveying "seconds" from belt 30.

Thus it is seen that the pears which cannot be canned as halves are removed from the conveyor so that only the well shaped fruit or higher grade of pears, fancy, choice and standard continue on to the fillers.

The guide 46 terminates at a point on the belt 26 spaced forwardly of the belt 65 in an outwardly directed deflector plate 75 which deflects the standard grade pears off the belt 26 into filler 76 where they are canned.

Similarly a deflector plate 77 secured to guide 45 deflects the "choice" grade pears into a filler 78. In Fig. 2 a relatively short deflector 79 is indicated intermediate the filler 78 and the belt 65 which may be employed to deflect one half of the pears which are carried on belt 26 between guides 45 and 49 into the filler 80. This arrangement would be employed when it is desired to sort the "choice" pears into "long" and "stub" sub-grades. In such an event an operator schematically designated D in Fig. 2 may be positioned rearwardly of the filler 80 and adjacent the belt 26 for dividing the choice pears so that they will enter filler 78 or 80 depending on their size.

It will be noted that the fancy pears have continued along a path of travel centrally of the belt 26 without handling of any type. These pears may be canned at fillers 85 and 86 which are positioned on opposite sides of belt 26, and attended by operators E, adjacent the forward end of the belt 26. Stationary rearwardly converging deflectors 87, 88 are adapted to deflect the fancy pears into fillers 85, 86 respectively. To permit adjustment of the number of pear halves entering the filler 85, 86 an adjustable shear 92 is pivotally secured at its forward end to the juncture of deflectors 87, 88 and is adjustably secured at its rear end to a support 91 which in turn extends generally transversely across belt 26 and is secured at its ends to the fillers 85, 86 respectively. Operators, schematically indicated at F may sort the pears into "longs" and "shorts" if desired so that the cans filled at fillers 85, 86 may be further classified by the above mentioned grades.

The adjustable shear 89 permits use of only one filler if desired when the number of fancy pears in any run changes and if a break-down into "longs" and "shorts" is not desired. The number of canning operators E may of course be varied according to the proportion of "fancy" pears.

Figure 4:
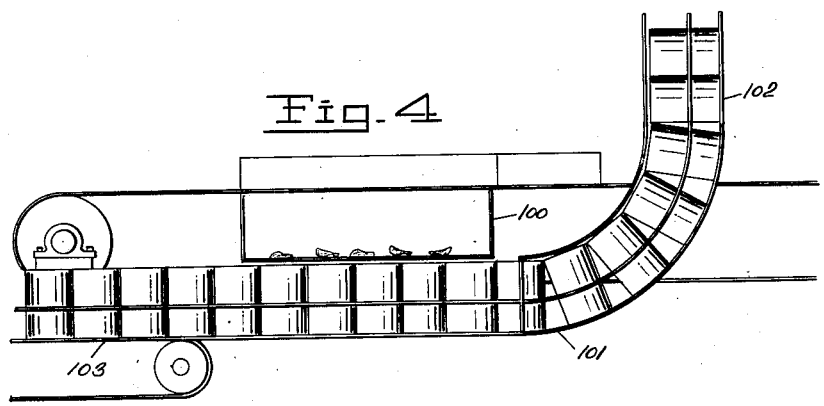
Fig. 4 is a side elevational view of one of the filling stations of the structure as taken along lines 4—4 of Fig. 2.

In Fig. 4 one of the fillers for fancy pears is shown in elevation, but it will be understood that the others are similar and of conventional structure. Each filler comprises a trough or chute 100 which receives the pears from the belt 26 and a frame 101 which supports the cans during the filling operation. This frame 101 is formed with an upwardly directed leg 102 within which the cans pass downwardly from an upper can-filling station (not shown). After the cans are filled on the horizontal run of frame 101 they are picked up by the conveyor 103 and transferred to the sealing station where the cans are sealed. It is pertinent to note that between the peeling and canning operations the fancy pears have been free from any manual handling with the exception perhaps of some sliding movement by operators E at the filling station although most of the pears enter the cans by gravity.

The belt 26 is supported at its forward end and driven by the pulley 105 which is rotatably supported at each end in bearings 106. Drive belt 107 connects the pulley 105 with a reducer 109 which in turn may be driven by motor 110.

The present invention permits a great saving of manpower and floor space and also minimizes damage to fruit due to handling; the latter factor is particularly important in the processing of pears.

The novel arrangement of belts 26, 15 and 30 permits the use of each belt along most of its length and at no time is belt space wasted. Belts 15 and 30, for example, simultaneously perform the function of carrying defective fruit from which portions must be removed and also fruit which has been trimmed and sorted according to size. Similarly belt 26 simultaneously performs the three functions of carrying the mass of ungraded fruit, segregating the fancy fruit into one path of travel on belt 26 and at the same time carrying the fancy, choice and standard fruit along separate paths of travel.

The inspection table above described makes for an extremely flexible arrangement. When the fruit is generally of a lower grade the number of trimmers along the troughs 38 may be increased and the number of fillers at the "fancy" filling station may be correspondingly reduced. In general the preferred procedure is to increase or reduce the number of trimmers so as to keep the can filling operation going at the most efficient rate of speed; this can readily be done with the present invention.

It is pertinent to note that the present system lends itself to an efficient can filling arrangement since there is no inspection operation required by the operators filling the cans.

I claim:

1. In a fruit inspection and grading system for inspecting and grading fruit, a horizontally extending conveyor adapted to support fruit halves thereon for movement longitudinally therewith toward a filling station, stationary means over said conveyor dividing the latter into a plurality of longitudinally extending passageways along which fruit halves of different grades are adapted to be moved on said conveyor, deflecting means for deflecting fruit halves on said conveyor into one of said passageways, said one passageway being covered and the remainder of said passageways being open along their upper sides over coextensive portions of their lengths whereby fruit may be inserted into said remainder of said passageways through their upper sides at said coextensive portions.

2. In a fruit inspection and grading system for inspecting and grading fruit, a horizontally extending conveyor adapted to support fruit halves thereon for movement longitudinally therewith towards a filling station, a plurality of longitudinally extending guides positioned over said conveyor for forming passageways therebetween for fruits of different grades, means for deflecting fruit on said conveyor into one of said passageways centrally of said conveyor, the remainder of said passageways being positioned on opposite sides of said one passageway and being open along their upper sides for receiving fruit halves therethrough during said movement, said one passageway being covered for a portion of its length coextensive with portions of said open passageways to prevent entrance of fruit to said one passageway except from said conveyor.

3. In a fruit inspection and grading system, first and second inspection stations for inspecting the core side and convex side respectively of fruit halves, first and second conveyors for receiving defective fruit from said first and second inspection stations respectively and for moving such fruit along separate parallel paths of travel toward a trimming station, a third conveyor positioned between said first and second conveyors and coplanar therewith for receiving passed fruit from said inspection stations, means for deflecting all fruit from said first and second conveyors into said trimming station, said conveyors extending past said trimming station for receiving fruit from the latter after such fruit has been trimmed, means adjacent said trimming station for dividing each of said conveyors into a plurality of passageways adapted to receive fruit of different grades, one of said passageways on said third conveyor being covered and the remainder being open over coextensive portions of their lengths to prevent entrance of trimmed fruit into said one passageway.

ROBERT C. PAULUS.

REFERENCES CITED

The following references are of record in the file of this patent:

UNITED STATES PATENTS

| Number | Name | Date |
|---|---|---|
| 1,030,479 | Ofstad | June 25, 1912 |
| 1,083,397 | Gilbert | Jan. 6, 1914 |
| 1,180,877 | Peterson | Apr. 25, 1916 |
| 1,461,702 | Stebler et al. | July 10, 1925 |
| 1,878,099 | Bost | Sept. 20, 1932 |
| 1,906,331 | Phelps | May 2, 1933 |
| 2,060,153 | Whipple | Nov. 10, 1936 |
| 2,322,190 | Fleming | June 15, 1943 |